US008275645B2

(12) United States Patent
Kind (10) Patent No.: US 8,275,645 B2
(45) Date of Patent: Sep. 25, 2012

(54) METHOD AND SYSTEM FOR RECURSION CHECK AND LOW-LEVEL CODE GENERATION FOR DIRECTED GRAPH

(75) Inventor: Jaakob Kind, Heidelberg (DE)

(73) Assignee: SAP AG, Walldorf (DE)

(*) Notice: Subject to any disclaimer, the term of this patent is extended or adjusted under 35 U.S.C. 154(b) by 782 days.

(21) Appl. No.: 12/336,566

(22) Filed: Dec. 17, 2008

(65) Prior Publication Data

US 2010/0153152 A1 Jun. 17, 2010

(51) Int. Cl.
*G06Q 10/00* (2012.01)
*G06F 9/445* (2006.01)

(52) U.S. Cl. .................................... 705/7.11; 717/174

(58) Field of Classification Search ............ 705/7, 7.11; 717/174
See application file for complete search history.

(56) References Cited

U.S. PATENT DOCUMENTS

| | | | | |
|---|---|---|---|---|
| 5,197,001 A * | 3/1993 | Mukherjee | | 705/29 |
| 5,201,046 A * | 4/1993 | Goldberg et al. | | 1/1 |
| 5,522,022 A * | 5/1996 | Rao et al. | | 345/440 |
| 5,634,113 A * | 5/1997 | Rusterholz | | 716/106 |
| 5,970,490 A * | 10/1999 | Morgenstern | | 1/1 |
| 5,971,596 A * | 10/1999 | Nishikawa | | 716/112 |
| 6,038,538 A * | 3/2000 | Agrawal et al. | | 705/7.11 |
| 6,049,742 A * | 4/2000 | Milne et al. | | 700/99 |
| 6,086,619 A * | 7/2000 | Hausman et al. | | 703/6 |
| 6,175,844 B1 * | 1/2001 | Stolin | | 715/210 |
| 6,347,256 B1 * | 2/2002 | Smirnov et al. | | 700/100 |
| 6,892,192 B1 * | 5/2005 | Geddes et al. | | 706/14 |
| 7,467,128 B2 * | 12/2008 | Larson et al. | | 1/1 |
| 7,660,705 B1 * | 2/2010 | Meek et al. | | 703/2 |
| 2003/0046307 A1 * | 3/2003 | Rivette et al. | | 707/104.1 |
| 2003/0055614 A1 * | 3/2003 | Pelikan et al. | | 703/2 |
| 2003/0069736 A1 * | 4/2003 | Koubenski et al. | | 705/1 |
| 2003/0097252 A1 * | 5/2003 | Mackie | | 704/9 |
| 2003/0167265 A1 * | 9/2003 | Corynen | | 707/4 |
| 2004/0036721 A1 * | 2/2004 | Anderson et al. | | 345/848 |
| 2005/0010675 A1 * | 1/2005 | Jaggi et al. | | 709/232 |
| 2005/0192783 A1 * | 9/2005 | Lystad et al. | | 703/3 |

(Continued)

OTHER PUBLICATIONS

J.H. ter Bekke and J.A. Bakker, Fast Recursive Data Processing in Graphs Using Reduction, Feb. 10, 2003, Faculty of Information Technology and Systems, Delft University of Technology, pp. 1-5.*

(Continued)

*Primary Examiner* — Elaine Gort
*Assistant Examiner* — Ashford S Hayles (57) ABSTRACT

A method and a system for fast recursion check and low-level code generation for directed graph. In a directed graph each vertex is connected to at least one other vertex with a directed edge to form an ordered pair of a source vertex and a target vertex. Low-level codes are assigned to the vertices of the directed graph, where for each ordered pair the low-level code of the target vertex is bigger than the low-level code of the source vertex. A new edge is added to connect a first vertex and a second vertex of the graph, where the first vertex is the source vertex and the second vertex is the target vertex of the new ordered pair. The low-level code of the target vertex of the new ordered pair is not bigger than the low-level code of the source vertex. For the new ordered pair and all ordered pairs that descend from the new ordered pair, the low-level codes of the target nodes are changed to values bigger than the low-level codes of the corresponding source vertices, when necessary.

20 Claims, 6 Drawing Sheets

U.S. PATENT DOCUMENTS

| | | |
|---|---|---|
| 2006/0098671 A1* | 5/2006 | Shachnai et al. .............. 370/404 |
| 2006/0168182 A1* | 7/2006 | Fuller et al. ................... 709/223 |
| 2006/0190105 A1* | 8/2006 | Hsu et al. ....................... 700/86 |
| 2007/0162903 A1* | 7/2007 | Babb et al. .................... 717/154 |
| 2008/0167919 A1* | 7/2008 | Clayton et al. ................... 705/7 |
| 2009/0063211 A1* | 3/2009 | Campo et al. .................... 705/7 |
| 2009/0076781 A1* | 3/2009 | Benayon et al. ................. 703/2 |
| 2009/0177449 A1* | 7/2009 | Benayon et al. ................. 703/2 |
| 2009/0276202 A1* | 11/2009 | Susarla et al. ................. 703/21 |
| 2010/0079458 A1* | 4/2010 | Koehler et al. ............... 345/440 |
| 2010/0161098 A1* | 6/2010 | Lilly et al. .................... 700/101 |

OTHER PUBLICATIONS

Douglas C. Schmidt and Larry E. Druffel, A Fast Backtracking Algorithm to Test Directed Graphs for Isomorphism Using Distance Matrices, Jul. 1976, Journal of the Association for Computing Machinery, vol. 23 No. 3 pp. 433-445.*

* cited by examiner

METHOD AND SYSTEM FOR RECURSION CHECK AND LOW-LEVEL CODE GENERATION FOR DIRECTED GRAPH

FIELD OF INVENTION

The field of the invention relates generally to electronic data processing and more particularly to recursion check and low-level code generation for directed graphs in enterprise computer systems.

BACKGROUND OF THE INVENTION

With the beginning of its development, computer technology broadly implements graph theory. Every computer network could be viewed as a graph with certain properties including a plurality of computer devices as nodes. In software applications, graph theory provides various algorithms for data processing. The automation of an increasing number of business processes is one of the most challenging areas for the development of computer technology. In this field, graph theory helps with efficient solutions of numerous problems.

For example, bill of materials (BOM) is commonly used by manufacturers to describe raw materials, sub-assemblies, intermediate assemblies, sub-components, components and parts, and the quantities of each needed to manufacture a final product. BOMs are exchanged between manufacturers and suppliers and are used for planning and controlling the process of producing final product. In general, BOMs could be described as a directed acyclic graph with the final product as a root vertex, and a plurality of leaf vertices representing the raw materials or components necessary to produce the final product.

To each vertex or component in a BOM directed graph could be assigned a low-level code, e.g., a number, to facilitate the material requirements planning. When a bill of materials is changed, it has to be checked if BOM recursion occurs. Further, the low-level codes need to be recalculated when the added vertices and edges violate the previously established order. This is important in order to keep a consistent relationships between the materials. For large and complex BOMs, these tasks are time consuming for the currently applied algorithms, and may lead to system performance problems.

There are other business applications that apply the same concept of directed graphs with assigned low-level codes to the nodes. In addition to BOM relations, a directed graph could contain edges that represent material or component replacement, material transportation from one site to another, etc.

SUMMARY OF THE INVENTION

A method and a system for fast recursion check and low-level code generation for directed graph are described. In a directed graph, each vertex of a set of vertices is connected to at least one other vertex with a directed edge to form an ordered pair of a source vertex and a target vertex. Low-level codes are assigned to the vertices of the directed graph, where for each ordered pair the low-level code of the target vertex is bigger than the low-level code of the source vertex. A new edge is added to connect a first vertex and a second vertex of the graph, where the first vertex is the source vertex and the second vertex is the target vertex of the new ordered pair. For the new ordered pair and all ordered pairs that are direct or indirect successors of the second vertex a topological sort is performed. During the sorting, for each ordered pair in the subgraph a new low-level code to a target vertex is assigned when an old low-level code of the target vertex is not greater than a low-level code of a corresponding source vertex, the new low level code is greater than the low-level code of the corresponding source vertex.

BRIEF DESCRIPTION OF THE DRAWINGS

A better understanding of the present invention can be obtained from the following detailed description in conjunction with the figures of the accompanying drawings in which like references indicate similar elements. It should be noted that references to "an" or "one" embodiment in this disclosure are not necessarily to the same embodiment, and such references mean at least one.

DETAILED DESCRIPTION

Bill of Materials (BOM), as well as a large number of other business objects and processes, may be efficiently represented by directed acyclic graphs or networks. In a directed graph, each vertex or node of a set of vertices is connected to at least one other node with a directed edge or arc. In a directed graph isolated vertices may also exist, then the set of vertices is a subset of all vertices of the directed graph. A directed arc flows out from a source node and goes to a target node. Every directed acyclic graph has one or more topological sorts. In graph theory, topological sorting or ordering means linear ordering of the vertices in which each vertex comes before all its target vertices within the ordering. A source vertex and a target vertex connected with a directed arc form an ordered pair. If there is at least one cycle, topological ordering is not possible.

In the BOM example, the vertices of the directed graph represent components necessary to build a particular product.

Figure 1A:
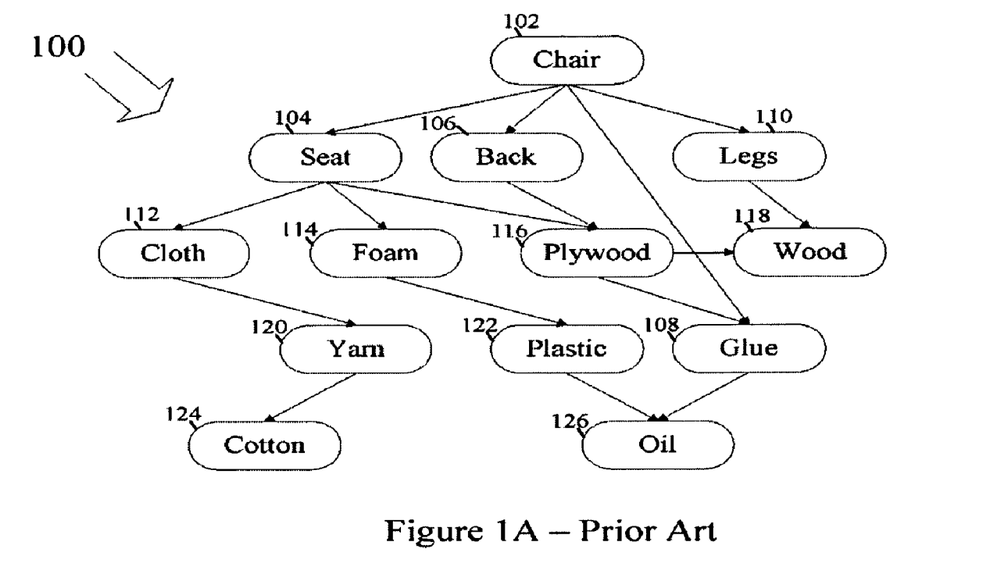
FIG. 1A illustrates a block diagram of a simplified prior art bill of materials for manufacturing a kitchen chair.

FIG. 1A is block diagram 100 of a simplified BOM for manufacturing a kitchen chair. Node 102 represents the finished product and, in this example, is the root node of the directed graph of the BOM. The chair is built by three major components represented by nodes: seat 104, back support 106, and legs 110. These three major components are connected together with glue, node 108. Each major component comprises one or more lower level components represented by nodes cloth 112, foam 114, plywood 116, yarn 120, plastic 122, wood 118, cotton 124, and oil 126. A source component is produced by traversing the source components target or lower level components or ingredients.

Figure 1B:
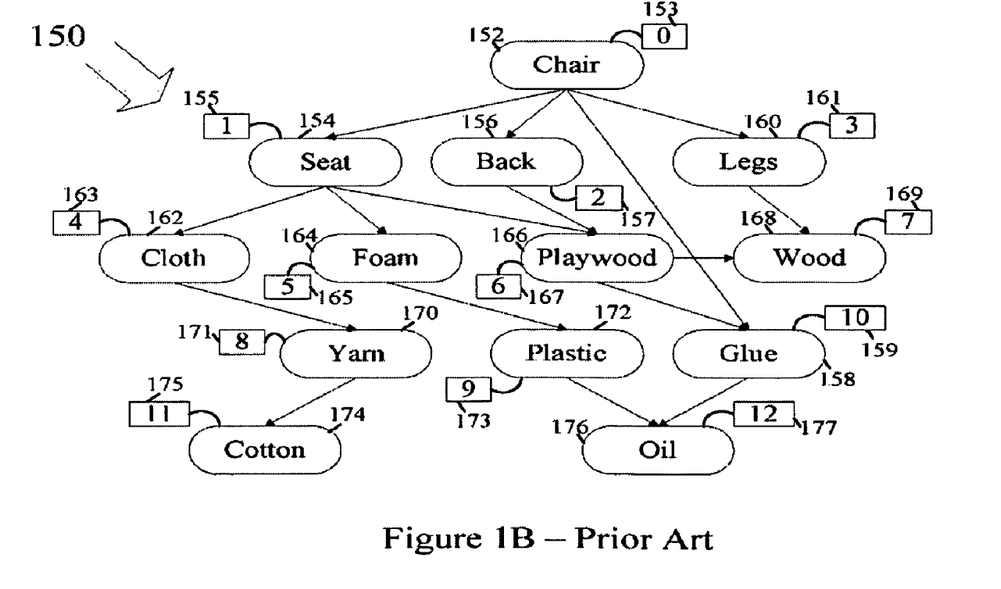
FIG. 1B illustrates a block diagram of a simplified prior art bill of materials for manufacturing kitchen chair with assigned low-level codes to components.

FIG. 1B is a block diagram 150 of the same BOM for producing a kitchen chair with assigned low-level codes to the different components. Low-level codes are stored within tags 153, 155, 157, 159, 161, 163, 165, 167, 169, 171, 173, 175, and 177, corresponding to nodes chair 152, seat 154, back 156, glue 158, legs 160, cloth 162, foam 164, plywood 166, wood 168, yarn 170, plastic 172, cotton 174, and oil 176 respectively. The low-level codes are important for various tasks that are connected with BOM processing.

For example, low-level codes are required in material requirements planning (MRP) for managing manufacturing process. In general, an MRP creates requirement coverage elements, e.g production or purchase orders, for independent requirements, e.g. customer orders, and dependent requirements. A dependent requirement for product B is caused by a production order of product A if product B is a component that is needed to assemble product A. If the MRP run for multiple products and processes the products in a random order, it might happen that a product needs to be processed multiple times. For example, product B is processed before product A, but processing of product A creates a dependent requirement for product B, hence, product B needs to be processed again. This can be prevented by processing the products in the order of ascending low-level codes. In the example, product B has a higher low-level code than product A and product A is processed first.

Low-level codes may be unique when each node or vertex in the acyclic directed graph has its own low-level code. For some processes or tasks, it is not necessary to define unique level codes. In such a case, low-level codes provide information for the depth or the order of a material within a BOM. The non-unique low-level code may equal the longest path from the root to the particular node for a material. The low-level code for a root vertex is zero. The low-level code of a target node is always bigger than the low-level code of a source node. This requirement is referred to as a rule for any directed acyclic graph throughout this document, regardless if the low-level codes are unique or not. An ordered set of unique low-level codes assigned to the nodes of a directed acyclic graph correspond to a topological sort of the graph.

Figure 2A:
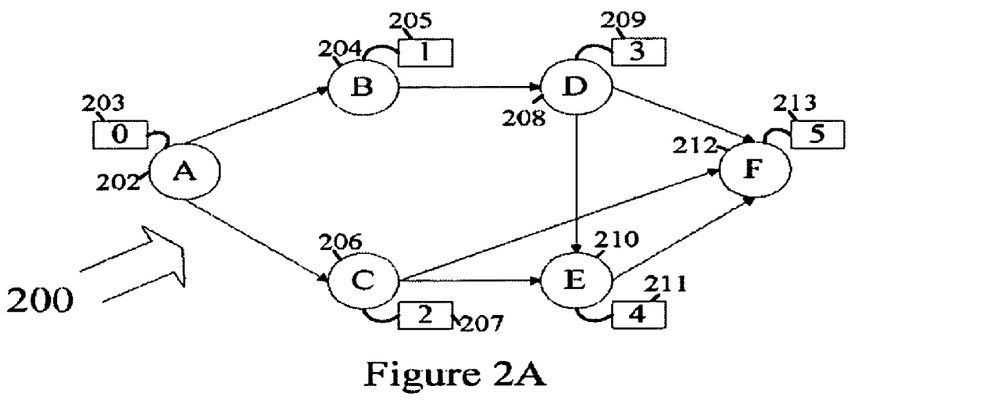
FIG. 2A illustrates a block diagram of an acyclic directed graph with assigned unique low-level codes, according to one embodiment of the invention.

FIG. 2A is a block diagram of an acyclic directed graph 200 with unique low-level codes assigned to its nodes, the codes are stored in tags. Node A 202 is assigned low-level code 0, and the code is stored in tag 203; node B 204 is assigned low-level code 1 and the code is stored in tag 205; node C 206 is assigned low-level code 2 and the code is stored in tag 207; node D 208 is assigned low-level code 3 and the code is stored in tag 209; node E 210 is assigned low-level code 4 and the code is stored in tag 211; and node F 212 is assigned low-level code 5 and the code is stored in tag 213. Nodes or vertices identify a set V:

V={A, B, C, D, E, F}

The illustrated edges or arcs identify set A:

A={(A, B), (A, C), (B, D), (C, E), (C, F), (D, E), (D, F), (E, F)}

The assigned low-level codes define a topological order of the vertices.

Figure 2B:
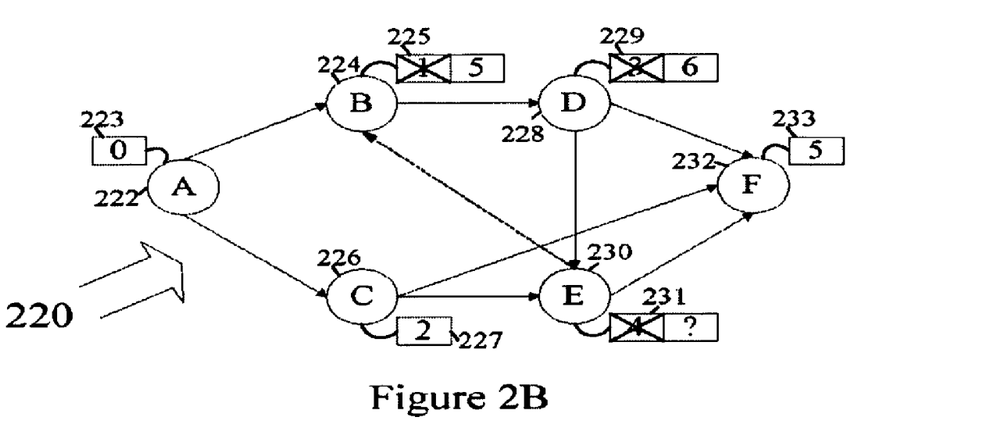
FIG. 2B illustrates a block diagram of an acyclic directed graph with assigned unique low-level codes and an additional edge, according to one embodiment of the invention.

FIG. 2B is a block diagram of graph 220. Graph 220 is similar to graph 200, having the same sets of nodes and arcs with one additional arc connecting node E 230 with node B 224. In the newly formed ordered pair, node E 230 is a source vertex and node B 224 is a target vertex. The low-level code assigned to vertex E 230 via tag 231 is 4. The low-level code assigned to vertex B 224 via tag 225 is 1. Thus, the low-level code of the source node is greater than the low-level code of the target node. With prior art processes, there are two approaches to correct this. One is to perform new topological ordering of the whole graph and to assign new low-level codes to all vertices of the graph. Another approach is to change the low-level code of the target node, and consecutively check and correct when necessary the low-level codes of all direct and indirect successor vertices to ensure that they do not violate the rule l(source)<l(target), where l(source) is the low-level code of the source vertex in an ordered pair, and l(target) is the low-level code of the target vertex in the same ordered pair.

As FIG. 2B illustrates, the new ordered pair (E, B) creates a loop in graph 220. In such a case, it is not possible to order the vertices of graph 220 topologically, according to graph theory. If the low-level code of node B 224 is changed to 5 in tag 225 in order to be greater than the low-level code of node E 230, then the low-level code of node D 228 has to be changed to a value greater than the new low-level code of node B 224, as nodes B and D form an ordered pair in which D is the target node. For example, if the low-level code of node D 228 is changed to 6 in tag 229. For the same reason, the low-level code of node E has to be changed to a value bigger than the new low-level code of node D 228. This would lead to an endless loop of increasing the values of low-level codes of nodes E 231, B 224 and D 228 in tags 231, 225 and 229. Thus, it is not possible to assign low-level codes to these vertices consistent with the rule as stated above.

Figure 2C:
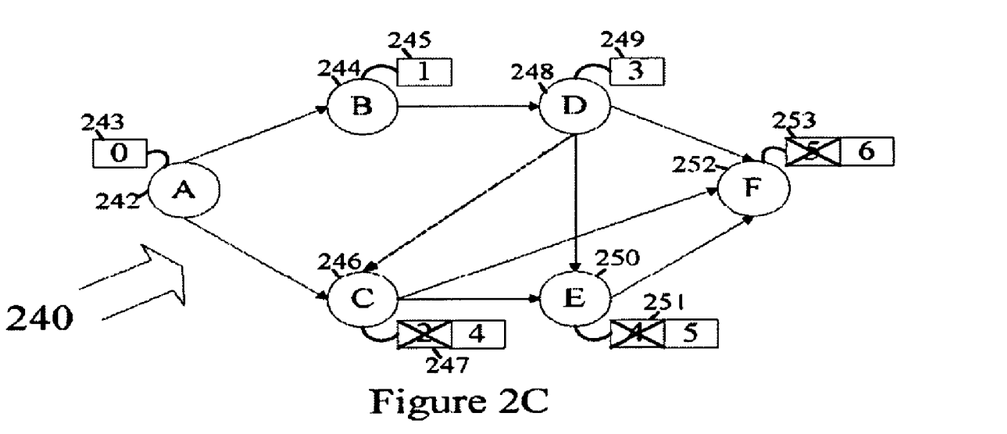
FIG. 2C illustrates a block diagram of an acyclic directed graph with assigned unique low-level codes and an additional edge, according to one embodiment of the invention.

FIG. 2C is a block diagram of acyclic graph 240, in which graph 240 is similar to graph 200, having the same sets of nodes and arcs with one additional arc connecting node D 248 with node C 246. In the newly formed ordered pair D 248 is the source vertex and C 246 is the target vertex. Graph 240 is quite simple and does not form a cyclic loop. However, when implemented in a business application such as a BOM, each time a directed graph is changed, it needs to be checked for recursion and the low-level codes that are needed for material requirements planning need to be recalculated. Thus, the whole directed graph would be topologically re-ordered and each node will receive a new low-level code, corresponding to the new topological order. The topological ordering of a graph requires linear time, e.g. each ordered pair of the graph is processed once. For large graphs with complex structure, the topological ordering could be very time consuming.

Using an alternative approach, only the existing low-level codes that conflict with the change are recalculated. The new arcs are examined for recursion and the conflicting low-level codes are recalculated. In a recursive routine, when the low-level code of a node is changed, the low-level code of one of its target nodes needs to be checked for a loop and for consistency with the rule (l(source)<l(target)). This process continues until there are no more detected violations of the rule or until a recursion is detected. While in the most cases this is more effective than reordering of the whole graph, there are situations in which this approach will need more than the linear time of the reordering process. For example, in a graph with n nodes and arcs (i, i+1) for all i=1, ..., n−1 and (i, i+2) for all i=1, ..., n−2; if the arcs are processed with descending source node id, this algorithm requires quadratic run time.

According to an embodiment of the present invention, a topological ordering in linear time is applied to a minimum set of nodes and arcs that potentially could violate the rule. This approach implements a process that guarantees linear running time over a subset of the entire graph. The implemented process determines a set of all nodes and arcs that are direct or indirect successors of the target nodes of those new arcs that violate the established rule. Referring back to FIG. 2C, a set B is identified to include:

B={(C, E), (C, F), (E, F)}

Set B defines a directed subgraph of graph 240. The low-level code of the target node of the new arc that conflicts with the established rule is changed to a higher value. As illustrated in FIG. 2C, the low-level code of node C 246 is changed from 2 to 4 and the new code is stored in tag 247. Subgraph B is sorted topologically, assigning new low-level codes to the target nodes, to comply with the rule. The low-level code of node E 250 is changed from 4 to 5 and the new code is stored in tag 251 and the low-level code of node F 252 is changed from 5 to 6 and the new code is stored in tag 253. Thus, there is no need to reorder the entire graph 240. Also, the risk to check, and possibly change, the low-level code of a node more than once is avoided (e.g., to compare the low-level code of node F 252 with the low-level code of node C 246, and then with the low-level code of node E 250).

Figure 3A:
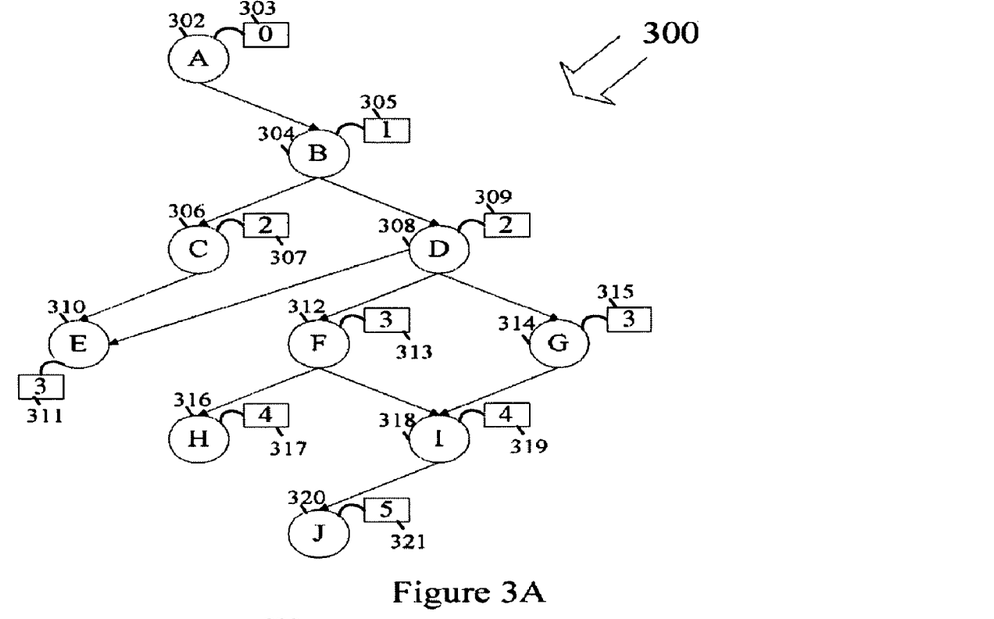
FIG. 3A illustrates a block diagram of an acyclic directed graph with assigned not unique low-level codes, according to one embodiment of the invention.

FIG. 3A is a block diagram of acyclic directed graph 300. The nodes of graph 300 are topologically sorted with assigned low-level codes. The low-level code of each node corresponds to the longest directed path (e.g., the number of arcs from the root node to the node). In graph 300, root node A 302 is assigned low-level code 0 and the code is stored in tag 303; node B 304 is assigned low-level code 1 and the code stored in tag 305. Nodes C 306 and D 308 are assigned low-level code 2 and the code is stored in tags 307 and 309 respectively. Similarly, nodes E 310, F 312 and G 314 are assigned low-level code 3 and the code is stored in tags 311, 314 and 315 respectively. Nodes H 316 and I 318 is assigned low-level code 4 and the code is stored in tags 317 and 319 respectively; and node J 321 is assigned low-level code 5 and the code is stored in tag 321.

Figure 3B:
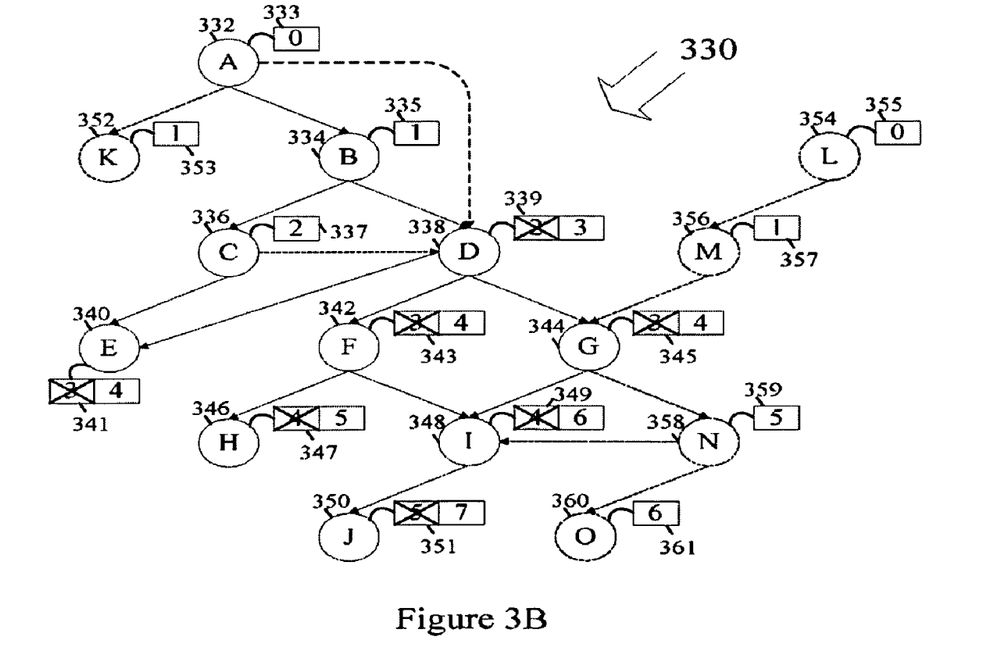
FIG. 3B illustrates a block diagram of an acyclic directed graph with assigned not unique low-level codes and a plurality of additional vertices and edges, according to one embodiment of the invention.

FIG. 3B is a block diagram of acyclic graph 330. Graph 330 is similar to graph 300 from FIG. 3A expanded with new vertices and edges. The newly added vertices and edges are indicated with dashed lines. Low-level codes need to be assigned to the added new vertices. All low-level codes in graph 330 must align with the rule 1(target)>1(source). In accordance with one embodiment of the invention, new vertices acquire low-level codes that are one unit greater than the low-level codes of the corresponding source vertices:

1(new target)=1(source)+1

A zero low-level code is attached to the new vertices with zero in-degree (incoming vertices).

Because there are zero incoming edges, new vertex L 354 is assigned low-level code 0 and the code is stored in tag 355. New vertices K 352 and M 356 are assigned low-level code 1 and the code is stored in tags 353 and 357 respectively. This value is greater by a unit than the low-level codes assigned to their corresponding source nodes A 332 and L 354, which are stored in tags 333 and 355 respectively.

The new edges in graph 330 define new ordered pairs that need to be checked for consistency. If the low-level code of a target node violates the rule, its value is changed to be greater than the low-level code of the source node. A subgraph B is identified to include the violating target nodes of all new edges, together with all nodes and edges that are direct or indirect successors of the violating target nodes.

For graph 330 in FIG. 3B, a new edge connects source node C 336 with target node D 338, and both nodes have low-level code 2, the code stored in tags 337 and 339 respectively. Node C 336 is a source vertex and node D 338 is a target vertex in the new ordered pair. To align the graph with the rule, the low-level code of node D 338 is changed to a greater value (e.g., to 3 as shown in tag 339). Because node D 338 is an violating target node, subgraph B is identified including vertices D 338, E 340, F 342, G 344, H 346, I 348, J 350, N 358, and O 360. Further, subgraph B includes the following edges:

{(D, E), (D, F), (D, G), (F, H), (F, I), (G, I), (G, N), (I, J), (N, I), (N, O)}

Subgraph B is sorted topologically and new low-level codes are assigned when needed. In subgraph B, node D 338 has zero in-degree and low-level code 3, the code stored in tag 339. According to one embodiment of the invention, for each ordered pair in directed subgraph B, the low-level code of the target vertex is compared with the low-level code of the source vertex. If not greater, the low-level code of the target vertex is recalculated to a unit greater than the low-level code of the source vertex. Thus, for ordered pairs (D, E), (D, F), and (D, G), low-level codes of nodes E 340, F 342 and G 344 are changed from 3 to 4 and the new codes are stored in tags 341, 343, and 345 respectively. For ordered pairs (F, H) and (G, N), the low-level codes of nodes H 346 and N 358 are recalculated to 5 and the new codes are stored in tags 347 and 359 respectively. Further, for ordered pairs (N, J) and (N, O), the low-level codes of nodes I 348 and O 360 are recalculated to 6 and the new codes are stored in tags 349 and 361 respectively. Finally, for ordered pair (I, J), the low-level code of node J 350 is recalculated from 5 to 7 and the new code is stored in tag 351, which is a unit greater than the low-level code of node I 348 as stored in tag 349.

Figure 4:
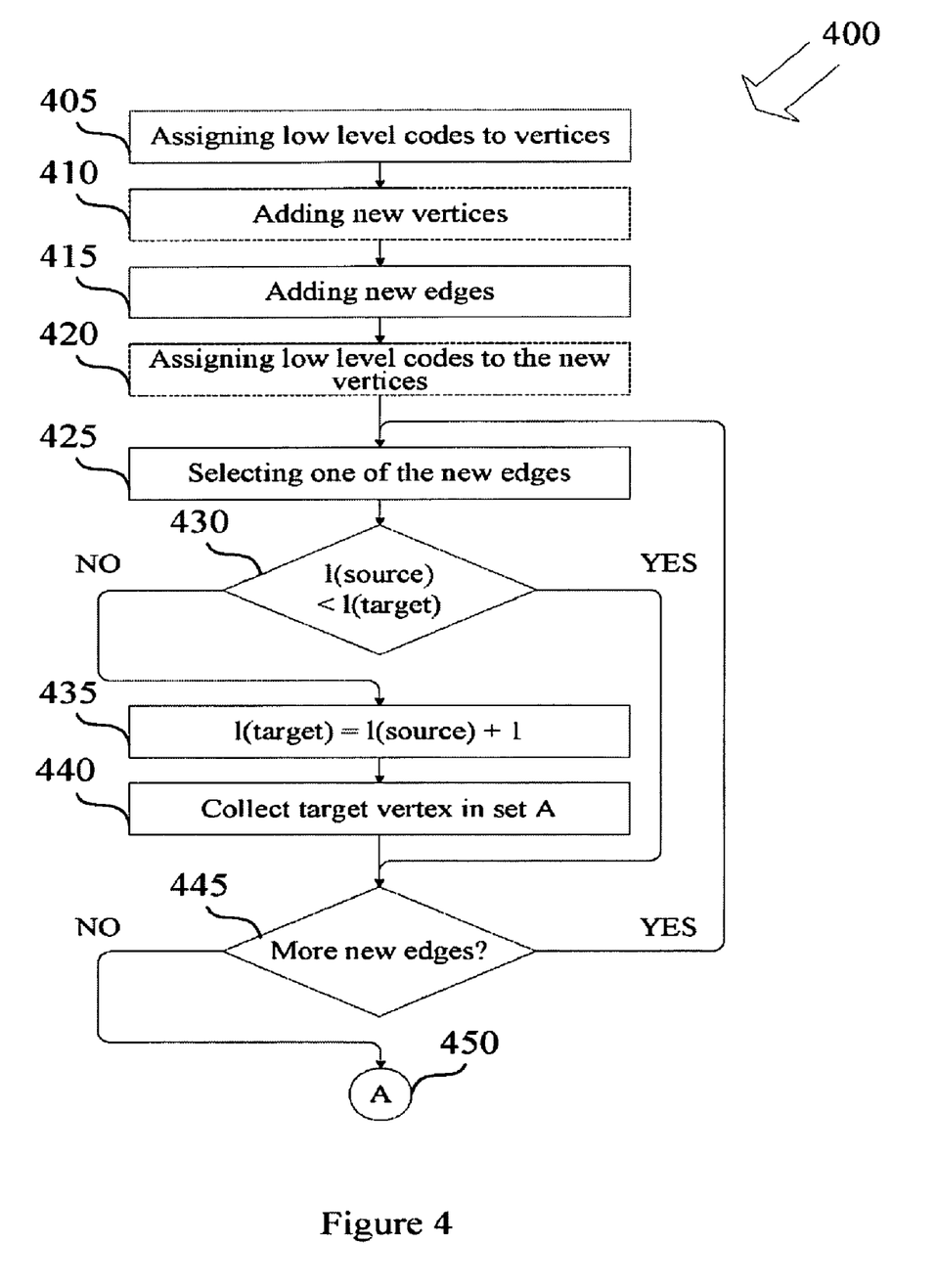
FIG. 4 illustrates a flow chart of a first part of a process for expanding an acyclic directed graph and recalculating inconsistent low-level codes, according to one embodiment of the invention.

FIG. 4 is flow chart 400 of a first part of a process for adding new edges to an acyclic directed graph and recalculating the resulting inconsistent low-level codes. Some of the operations in flow chart 400 are illustrated with boxes with dashed lines to indicate that these operations are optional. At block 405, low-level codes are assigned to all vertices of an acyclic directed graph. The low-level codes correspond to a topological sort of the directed graph. Each vertex of the graph may receive either a unique low-level code or two or more vertices may have the same low-level code. In both cases, for any two vertices that are connected by an edge, the following rule needs to be valid:

1(source)<1(target), where 1(source) is the low-level code assigned to the source vertex and 1(target) is the low-level code assigned to the target vertex.

At block 410, the directed graph is extended with one or more new vertices. At block 415, one or more new directed edges are added to the directed graph. Optionally, at block 420, low-level codes may be associated with the new vertices in compliance with the rule stated in the previous paragraph. In one embodiment of the invention, low level codes with zero value could be assigned to all new vertices at block 420. If the new edges connect vertices with already assigned low-level codes, occurrences of violations of the rule are possible. Therefore, according to one embodiment of the invention, at block 425, one of the new edges is selected. At block 430, the low-level codes of the vertices connected by the edge are checked whether they comply with the rule. If they do not comply, at block 435, the low-level code assigned to the target vertex is recalculated to a new value that is greater than one unit of the low-level code assigned to the source vertex. The target vertex with the recalculated low-level code is added to a set A at block 440.

Operations of blocks 425 to 440 are executed repeatedly for all new edges, until, at block 445, it is confirmed that all new edges are checked for compliance with the rule. At this point, set A contains all vertices with recalculated low-level codes. At block 450, the first part of the process ends. Referring back to FIG. 3B, for directed graph 330, set A would contain vertex D 338, and, depending on whether and how low-level codes were assigned to the new vertices, vertex I 348.

Figure 5:
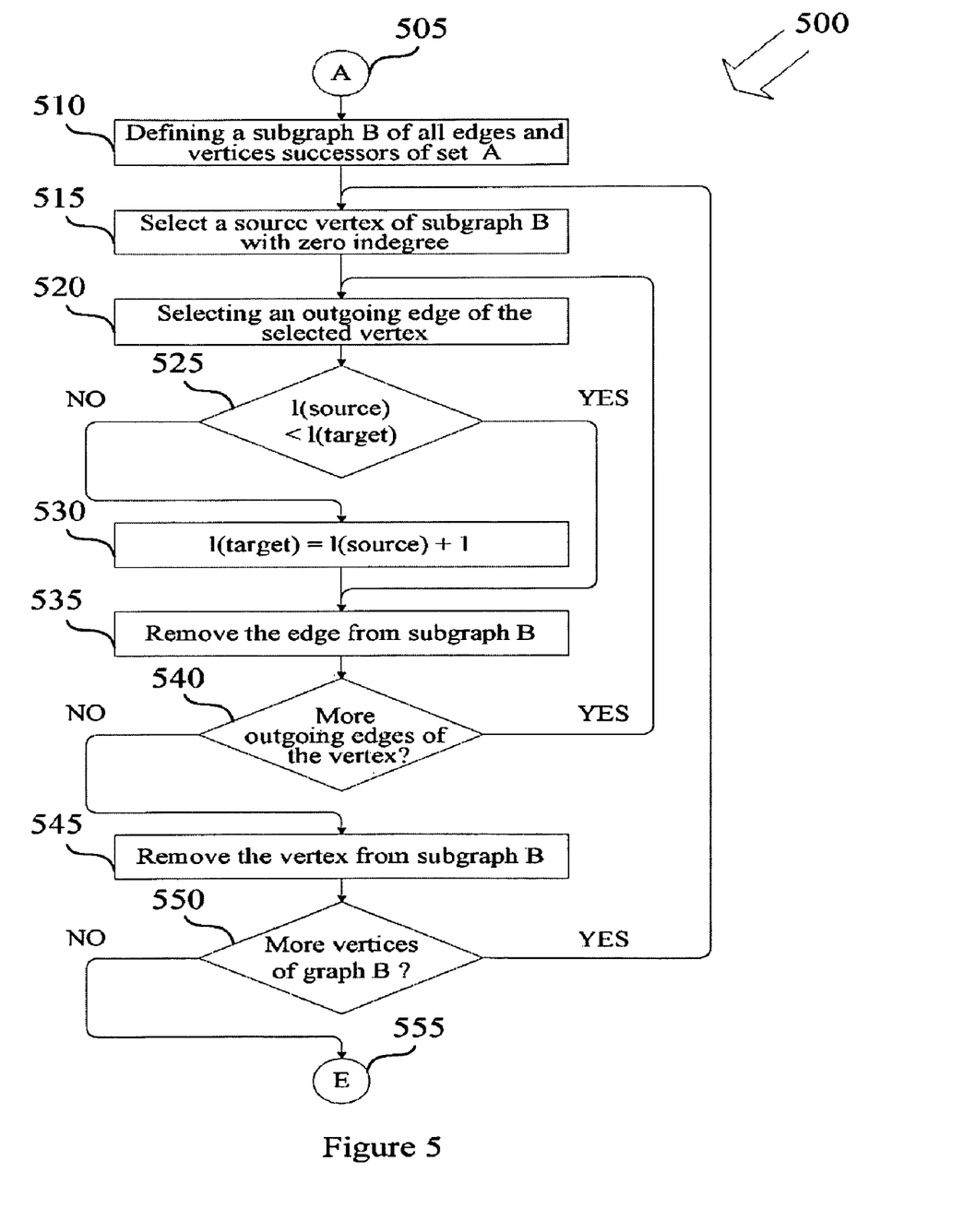
FIG. 5 illustrates a flow chart of a second part of a process for extending an acyclic directed graph and recalculating inconsistent low-level codes, according to one embodiment of the invention.

FIG. 5 is flow chart 500 of a continuation of the process for adding new edges to an acyclic directed graph and recalculating the resulting inconsistent low-level codes. The process continues, from chart 400, at block 505. In accordance with one embodiment of the invention, at block 510, a subgraph B is defined. Subgraph B includes all edges and vertices that are either direct or indirect successors of the vertices in set A. At block 515, a vertex with zero incoming edges (in-degree) is selected. An outgoing edge from the selected vertex is selected at block 520. At block 525, the low-level codes of the vertices of the ordered pair defined by the selected edge are compared with the rule for consistency. If the low-level code of the target edge is not greater than the low-level code of the source vertex, at block 530, a new low-level code greater than one unit of the low-level code of the source vertex is assigned to the target vertex:

$$l(target)=l(source)+1$$

At block 535, the selected edge is removed from subgraph B. The operations of blocks 520 through 535 are repeated for all outgoing edges from the vertex selected at block 515. At block 540, it is determined whether any more outgoing edges from this vertex are left. When all outgoing edges from the selected vertex are processed, the selected vertex itself is removed from subgraph B at block 545. The operations of blocks 515 through 545 are repeated until, at block 550, no more vertices are left in subgraph B. The process illustrated with flow chart 500 ends at block 555, according to one embodiment of the invention. At that point, all low-level codes in the directed graph are consistent with the rule. The process runs in linear time on a subset of the edges of the graph that includes the new edges and the successors of the infringing new edges. The process processes each edge of the subset only once. Thus, compared to the previous solutions, the process requires significantly on average less execution time.

Figure 6:
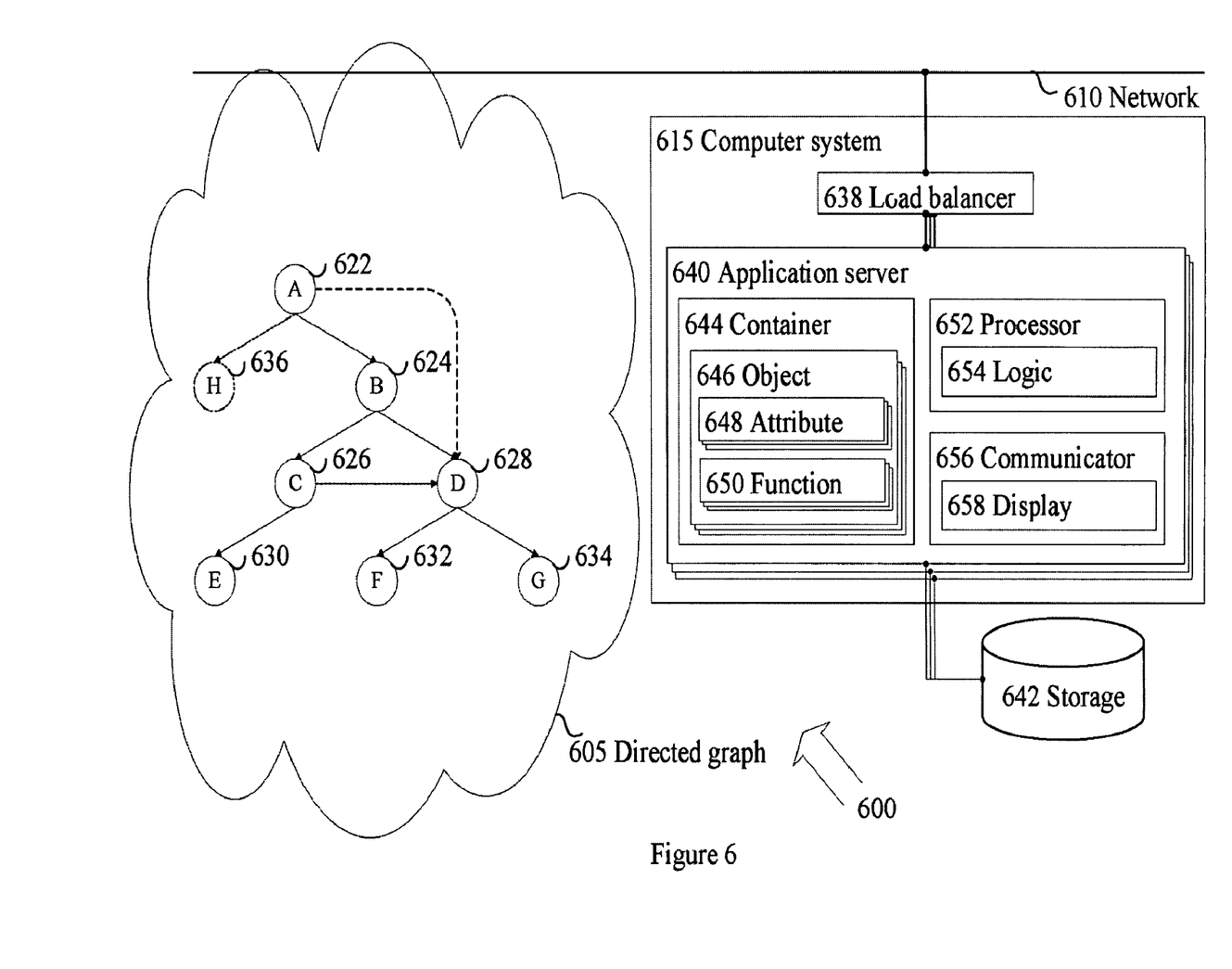
FIG. 6 illustrates a block diagram of a system for extending an acyclic directed graph and recalculating a number of resulting inconsistent low-level codes, according to one embodiment of the invention.

The presented process could be implemented in various technical environments. According to one of the embodiments of the invention, the process is implemented in a computer system, as illustrated in FIG. 6. FIG. 6 is a block diagram of system 600 for extending an acyclic directed graph and recalculating a number of resulting inconsistent low-level codes. The system includes directed graph 605, network 610, and computer system 615. Directed graph 605 is shown in FIG. 6 as nodes A 622, B 624, C 626, D 628, E 630, F 632, G 634, and H 636. Directed graph 605 is defined by its edges: {(A, B), (A, H), (A-D), (B, C), (B, D), (C, E), (C, D), (D, F), (D, G)}

Node H 636 and edges (A, H), (A, D), and (C, D) are illustrated with dashed lines to indicate that they are an extension of the original directed graph 605.

Computer system 615 includes at least one application server 640. When computer system 615 has distributed architecture, it could comprise more than one application server 640 with similar structure. Application servers 640 could run as a cluster. The different tasks performed by computer system 615 are routed to a particular application server 640 by load balancer 638 in accordance with predefined criteria, not limited to the current load of each application server 640. Application servers 640 could store common data on separate storage 642.

Application server 640 could be built in compliance with any established standardized application server (AS) software technology; e.g., Java Enterprise Edition (Java EE) AS or the like. Application server 640 runs a variety of applications to perform different tasks for automating one or more processes. Here it is assumed that application server 640 runs an enterprise application, e.g., supply chain management (SCM) system, customer relationship management (CRM) system, human resource (HR) planning system, etc. Computer system 615 could be established to automate the overall information processing in an enterprise.

Application server 640 comprises container 644 where a number of objects 646 are running. Container 644 provides an executing environment for the various enterprise applications and its functionality depends from the AS software technology standard that is applied. Application objects 646 in this document also represent instances of application objects. The object itself is the structure of a program or business element. Application objects 646 or the instances of application objects 646 could represent elements of directed graph 605. Each object could have numerous instances that have the same structure, but different content. For example, the names, types and providers of all elements required for manufacturing of a specific product could be entered in matching number of instances of "element" object in a SCM system.

Each object 646 is characterized by a number of attributes 648 and executes a number of functions 650, both specific for the object. Attributes 648 contain data pertinent to the programming or business entity represented by the object. For each instance of the object, attributes 648 contain data describing that particular instance. For example, an "element" object could have attributes that describe the name of the element, its supplier, the type of the element, its quantity, the relations with other instances, the assigned low-level code, etc.

Further, application server 640 comprises processor 652 to execute logic 654 for defining and managing a plurality of application object instance among objects 646 based on the structure of directed graph 605. In one embodiment of the invention, processor 652 is running in the environment provided by container 644. Logic 654 could be coupled with functions 650 trough a specific container interface (not shown), an application programming interface (API), or other interface. When application server 640 receives data about directed graph 605, the appropriate application objects 646 are identified by logic 654 executed by processor 652. The received data is assigned to relevant objects 646 and kept in storage 135.

According to one embodiment of the invention, application server 640 builds a structure of application object instances 646 to resemble the structure of directed graph 605. This structure includes appointing an object or object instance from objects 646 corresponding to each element of directed graph 605 and defining relationships between these objects (object instances) corresponding to the edges of directed graph 605. Consequently, to each object or object instance corresponding to an element of directed graph 605 a low-level code is assigned to each node compliant with the rule $$l(source) < l(target). \qquad (5)$$

When a change is made to directed graph 605, it is reflected in application server 640 and low-level codes are recalculated by processor 652 applying logic 654, using the process illustrated in FIG. 4 and FIG. 5.

Application server 640 receives data about directed graph 605 at communicator 656. Communicator 656 could further carry on a number of other tasks. For example, communicator 656 could send requests to a third parties for additional data regarding components of directed graph 605 (the third parties are not shown). The data about directed graph 605 could be entered manually through means of a user interface provided by communicator 656. Alternatively, the data about directed graph 605 could be received at communicator 656 automatically through network 610.

Communicator 656 includes display module 658 to provide a graphical user interface (GUI) to the users of enterprise applications running on application server 640. Display module 658 renders, via the GUI, attributes 648 of application objects 646. Further, the graphical user interface could render the data received from directed graph 605. The GUI also allows the users to interact with the applications running on application server 640. Through the GUI, a user could access different functionalities provided by the applications. In the context of the current invention, for example, a user could search for data received from directed graph 605. Data could be entered and assigned to a particular object and assigned data could be reassigned to another application object 646. The user could navigate through the GUI by using hyperlinks, menus, or other means.

Display 658 provides, via the GUI, access to a set of functions or a tool for managing logic 654 for reacting on adding new edges to acyclic directed graph 605 and recalculating the resulting inconsistent low-level codes.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. A computer implemented method for manipulating a bill of materials, the bill of materials comprising a plurality of components necessary to manufacture a product and a plurality of edges, wherein each component of the plurality of components is connected to at least one other component of the plurality of components with a corresponding at least one edge to form at least one ordered pair of a plurality of ordered pairs in the graph, wherein each ordered pair includes a source component and a target component of the plurality of components connected by a corresponding edge of the plurality of edges, the method comprising:

assigning by a processor of a computer system a corresponding low-level code to each component of the plurality of components, wherein for each edge of the plurality of edges, a low-level code of a target component is greater than a low-level code of a source component;

adding a new edge to the plurality of edges of the bill of materials connecting a first component and a second component of the plurality of components in a new ordered pair, wherein the first component is a source component and the second component is a target component of the new ordered pair, and wherein a low-level code of the second component is not greater than a low-level code of the first component;

sorting topologically by the processor at the computer system a subgraph comprising the new ordered pair, a subset of the plurality of components and a corresponding subset of the plurality of edges, wherein each component of the subset of components is direct or indirect successor of the second component of the new ordered pair; and during the sorting, for each ordered pair in the subgraph, assigning a new low-level code to a target component when an old low-level code of the target component is not greater than a low-level code of a corresponding source component, the new low level code is greater than the low-level code of the corresponding source component.

2. The method of claim 1, wherein a source component requires one or more target components to manufacture the product based on the bill of materials.

3. The method of claim 1, wherein a low-level code of a component from the plurality of components equals the number of edges of the longest directed path that ends at the component.

4. The method of claim 1, wherein a low-level code of a component from the plurality of components is set to a unique number.

5. A system comprising:

a bill of materials data structure comprising a plurality of components and a plurality of edges, wherein each component of the plurality of components is connected to at least one other component of the plurality of components with an edge to form an ordered pair of a source component and a target component;

a new edge to connect a first component and a second component from the plurality of components in a new ordered pair, the first component being a source component and the second component being a target component of the new ordered pair, wherein a low-level code of the second component is not greater than a low-level code of the first component;

a computer system to:

assign a low-level code to each component of the plurality of components, wherein for each ordered pair the low-level code of the target component is greater than the low-level code of the source component, sort topologically a subgraph comprising the new ordered pair and all ordered pairs that are direct or indirect successors of the second component of the new ordered pair, and during the sort, for each ordered pair in the subgraph, assign a new low-level code to a target component when an old low-level code of the target component is not greater than a low-level code of a corresponding source component, the new low level code is greater than the low-level code of the corresponding source component.

6. The system of claim 5, wherein the computer system is a distributed computer system comprising a plurality of application servers.

7. The system of claim 5, wherein the computer system further comprises:
an application server to execute a computer program to assign the low-level codes to the components of the bill of materials.

8. The system of claim 7, wherein the application server comprises:
a container to provide execution environment for the computer program;
a processor; and
a communicator to provide interface for receiving data for the directed graph bill of materials.

9. The system of claim 8, wherein the container comprises a plurality of objects to resemble the bill of materials.

10. A non-transitory machine readable medium having instructions stored therein which, when executed on a computer system, the computer system to manipulate a bill of materials comprising a plurality of components and a plurality of edges, wherein each component of the plurality of components is connected to another component of the plurality of components with an edge to form an ordered pair of a source component and a target component, cause the computer system to perform a set of operations comprising:
assigning a low-level code to each component of the plurality of components, wherein for each ordered pair, the low-level code of the target component is greater than the low-level code of the source component;
adding a new edge connecting a first component and a second component from the plurality of components in a new ordered pair, the first component being a source component and the second component being a target component of the new ordered pair, wherein a low-level code of the second component is not greater than a low-level code of the first component;
sorting topologically a subgraph comprising the new ordered pair and all ordered pairs that are direct or indirect successors of the second component of the new ordered pair; and
during the sorting, for each ordered pair in the subgraph, assigning a new low-level code to a target component when an old low-level code of the target component is not greater than a low-level code of a corresponding source component, the new low level code is greater than the low-level code of the corresponding source component.

11. The machine readable medium of claim 10, wherein each component of the plurality of components is necessary to manufacture a product and a source component requires one or more target components.

12. The machine readable medium of claim 10, wherein a low-level code of a component from the plurality of components equals the number of edges of the longest directed path that ends at the component.

13. The machine readable medium of claim 10, wherein a low-level code of a component from the plurality of components is set to a unique number.

14. The method of claim 1, wherein assigning the low-level code to each component of the plurality of components comprising:
generating by the processor a plurality of instances of at least one application object in a container of the computer system, wherein each component of the plurality of components of the bill of materials corresponds to an instance of the plurality of instances, and wherein each edge of the plurality of edges of the bill of materials corresponds to a relationship between corresponding instances of the plurality of instances; and
setting an attribute of each instance of the plurality of instances to the corresponding low-level code.

15. The method of claim 1, wherein adding the new edge comprises:
adding a new component to the plurality of components of the bill of materials;
assigning by the processor of the computer system a low-level code to the new component; and
adding the new edge to connect the new component in the bill of materials.

16. The method of claim 1, wherein sorting topologically the subgraph comprises:
applying an algorithm for topological sorting with running time linear to the number of components of the subset of the plurality of components and the number of edges of the subset of the plurality of edges.

17. The method of claim 1, wherein sorting topologically the subgraph comprises:
selecting a source component of the subset of the plurality of components, wherein the selected source component has zero indegree and at least one outdegree;
for each ordered pair including the selected component, assigning a new low-level code to a corresponding target component, when the previously assigned low-level code of the target component is not greater than a low-level code assigned to the selected source component; and
excluding the selected source component and at least one edge connecting the selected source component from the subgraph.

18. The machine readable medium of claim 10, wherein assigning the low-level code to each component of the plurality of components comprising:
generating by the processor a plurality of instances of at least one application object in a container of the computer system, wherein at least one component of the plurality of components of the bill of materials corresponds to at least one instance of the plurality of instances, and wherein at least one edge of the plurality of edges of the bill of materials corresponds to at least one relationship between instances of the plurality of instances; and
setting at least one attribute of the at least one instance of the plurality of instances to at least one low-level code value.

19. The machine readable medium of claim 10, wherein adding the new edge comprises:
adding a new component to the plurality of components of the bill of materials; and
adding the new edge to connect the new component in the bill of materials.

20. The machine readable medium of claim 10, wherein sorting topologically the subgraph comprises:
selecting a component of the subset of the plurality of components with zero indegree;
for an ordered pair including the selected component, assigning a low-level code to a corresponding target component greater than a low-level code assigned to the selected component; and
excluding the selected component from the subgraph.

* * * * *